United States Patent
Yu et al.

(10) Patent No.: US 10,991,157 B2
(45) Date of Patent: Apr. 27, 2021

(54) METHOD AND APPARATUS FOR MATCHING 3-DIMENSIONAL TERRAIN INFORMATION USING HETEROGENEOUS ALTITUDE AERIAL IMAGES

(71) Applicant: Electronics and Telecommunications Research Institute, Daejeon (KR)

(72) Inventors: Jung-Jae Yu, Daejeon (KR); Kyung-Kyu Kang, Daejeon (KR); Hye-Sun Kim, Daejeon (KR); Chang-Joon Park, Daejeon (KR); Yun-Ji Ban, Daejeon (KR); Dong-Wan Ryoo, Daejeon (KR); Man-Hee Lee, Daejeon (KR); Chang-Woo Chu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/664,517

(22) Filed: Oct. 25, 2019

(65) Prior Publication Data
US 2020/0202616 A1 Jun. 25, 2020

(30) Foreign Application Priority Data
Dec. 21, 2018 (KR) .................... 10-2018-0167509

(51) Int. Cl.
*G06T 17/05* (2011.01)
*G06T 17/20* (2006.01)
(Continued)

(52) U.S. Cl.
CPC ............... *G06T 17/05* (2013.01); *G06T 7/32* (2017.01); *G06T 17/20* (2013.01); *G06T 19/20* (2013.01);
(Continued)

(58) Field of Classification Search
CPC .... G06T 17/05; G06T 7/32; G06T 17/20; G06T 19/20; G06T 2207/10028;
(Continued)

(56) References Cited

U.S. PATENT DOCUMENTS 6,587,601 B1 7/2003 Hsu et al.
10,515,458 B1 * 12/2019 Yakimenko ............. G06T 17/05
(Continued)

FOREIGN PATENT DOCUMENTS

JP 2009145314 A 7/2009
KR 1020050061857 A 6/2005
(Continued)

*Primary Examiner* — Chong Wu
(74) *Attorney, Agent, or Firm* — William Park & Associates Ltd.

(57) ABSTRACT

Disclosed herein are a method and apparatus for matching 3D terrain information based on aerial images captured at different altitudes. The method includes receiving a high-altitude numerical height model based on a terrain image captured at a specific high altitude; receiving 3D terrain information observed from a low altitude, which is generated based on a terrain image captured at an altitude lower than the specific high altitude; generating a low-altitude numerical height model by converting the 3D terrain information into a numerical model in the same form as the high-altitude numerical height model; measuring the cross-correlation between the high-altitude numerical height model and the low-altitude numerical height model, thereby calculating matching parameters for enabling the low-altitude numerical height model to match the high-altitude numerical height model; and adjusting the geospatial coordinates of the 3D terrain information based on the matching parameters and outputting georeferenced 3D terrain information in the same coordinate system as the high-altitude numerical height model.

16 Claims, 5 Drawing Sheets

(51) Int. Cl.
*G06T 19/20* (2011.01)
*G06T 7/32* (2017.01)

(52) U.S. Cl.
CPC ............... *G06T 2207/10028* (2013.01); *G06T 2207/10032* (2013.01); *G06T 2207/20016* (2013.01); *G06T 2219/2016* (2013.01)

(58) Field of Classification Search
CPC . G06T 2207/10032; G06T 2207/20016; G06T 2219/2016
See application file for complete search history.

(56) References Cited

U.S. PATENT DOCUMENTS

| | | | |
|---|---|---|---|
| 2005/0271264 A1* | 12/2005 | Ito | G06T 7/593 382/154 |
| 2009/0154793 A1 | 6/2009 | Shin et al. | |
| 2011/0148866 A1 | 6/2011 | Chu et al. | |
| 2012/0155745 A1 | 6/2012 | Park et al. | |
| 2017/0200309 A1* | 7/2017 | Qian | G06T 17/05 |
| 2018/0157911 A1* | 6/2018 | Lo | G06K 9/00657 |

FOREIGN PATENT DOCUMENTS

| | | |
|---|---|---|
| KR | 100973052 B1 | 7/2010 |
| KR | 101006729 B1 | 1/2011 |

\* cited by examiner

METHOD AND APPARATUS FOR MATCHING 3-DIMENSIONAL TERRAIN INFORMATION USING HETEROGENEOUS ALTITUDE AERIAL IMAGES

CROSS REFERENCE TO RELATED APPLICATION

This application claims the benefit of Korean Patent Application No. 10-2018-0167509, filed Dec. 21, 2018, which is hereby incorporated by reference in its entirety into this application.

BACKGROUND OF THE INVENTION

1. Technical Field

The present invention relates generally to a method and apparatus for matching 3D terrain information using aerial images captured at different altitudes, and more particularly to a method and apparatus for matching 3D terrain information using aerial images captured at different altitudes, which enable pieces of 3D terrain information generated based on aerial images captured at different altitudes to be fused and used without previously measured Ground Control Point (GCP) data.

2. Description of the Related Art 3D terrain information, which includes the shapes and heights of terrain and aboveground features, may be generated by receiving satellite images, aerial images, aerial LiDAR data, or the like. When aerial LiDAR data is used, 3D terrain information of a large area may be generated by connecting pieces of information about heights at different vantage points. Also, when satellite images, aerial images, and the like are used, rather than aerial LiDAR data, 3D terrain information may be generated using a 3D reconstruction method based on triangulation and matching of feature information between input images.

When image matching or estimation of height information is performed based on satellite images, high-altitude aerial images, or the like, 3D terrain information in the form of a Digital Surface Model (DSM) or a Digital Elevation Model (DEM), which includes the heights of terrain and aboveground features over a large area, may be generated.

Meanwhile, when 3D reconstruction is performed based on images captured using an Unmanned Aerial Vehicle (UAV) or the like at a low altitude, 3D terrain information in the form of a 3D dense point cloud, which may represent not only information about the relief of terrain but also the 3D shapes of target objects observed from different angles, may be generated. Terrain information generated based on satellite images and high-altitude aerial images has an advantage in that it is easy to reconstruct terrain over a large area, but has a disadvantage in that it is technically difficult to represent detailed parts, such as buildings, vegetation, space under the eaves of buildings, and the like in the reconstructed 3D terrain information due to a low Ground Sampling Distance (GSD), compared to 3D terrain information based on images captured at a low altitude.

In the case of low-altitude aerial images captured using a UAV or the like, images having different resolutions may be acquired by adjusting a flight height, building information may be reconstructed as precisely as needed by acquiring a high-resolution image, and 3D reconstruction including the texture of lateral surfaces of aboveground objects may be performed because a small area of interest can be captured from different angles. However, compared to satellite images and high-altitude aerial images, low-altitude aerial images are suitable for 3D reconstruction of terrain of a relatively small area. When low-altitude aerial images are used in order to reconstruct the terrain of a large area in 3D, it takes a lot of time and expense to capture images and to perform operation for reconstruction.

In consideration of the difference between pieces of 3D terrain information based on images captured at different altitudes, it is necessary to fuse and collectively use the pieces of 3D terrain information reconstructed using aerial images captured at different altitudes in order to construct a 3D virtual environment for a large area so as to be used for various purposes. For example, fused 3D terrain information may be used for VR flight training based on actual images. Specifically, a virtual environment based on 3D terrain information that is reconstructed by receiving satellite images and high-altitude aerial images may be visualized when simulation of high-altitude flight is conducted, but a virtual environment based on 3D terrain information that is precisely reconstructed by capturing the actual image of an airport at a low altitude may be visualized when takeoff or landing simulation is conducted.

In order to use fused 3D terrain information based on aerial images captured at different altitudes, it is necessary to precisely match the positions, orientations, and scales between pieces of 3D terrain information based on aerial images captured at different altitudes; that is, to detect the geometric relationship therebetween. When 3D terrain information is reconstructed by receiving actual images, information about the positions and orientations of image-capturing cameras and terrain may be estimated using metadata, such as GPS data, inertial sensor data, and the like measured through satellites, airplanes, UAVs, and the like, and data obtained by matching the features of images. Here, error components included in such data may cause differences in the estimated positions and orientations. Especially, when 3D terrain information is reconstructed by receiving images captured using different types of devices at different altitudes, the differences may become larger. That is, the calculated position of a certain building in terrain information reconstructed based on a low-altitude aerial image may be different from the calculated position of the certain building in terrain information reconstructed based on a high-altitude aerial image. Here, if measurement data pertaining to the coordinates of Ground Control Points (GCPs), which are observed in common with the respective images, is used, it is possible to precisely match pieces of 3D terrain information, but it takes a lot of time and expense to measure GCPs that are regularly distributed over a large area. Also, it is possible for a worker to observe and identify terrain information and manually adjust and match the pieces of terrain information. However, when a target area is large, it takes a lot of time and effort, and the accuracy of the result of manual work may be unreliable. Therefore, what is required is technology for automatically matching pieces of 3D terrain information generated based on aerial images captured at different altitudes using a quantified optimization method through comparison of forms.

In this regard, Korean Patent Application Publication No. 10-2005-0061857 discloses a 3D-space-modeling apparatus using space information and a method therefor.

SUMMARY OF THE INVENTION

An object of the present invention is to enable precise geometry matching between pieces of 3D terrain information, which are reconstructed by receiving images captured at different altitudes. More particularly, the present invention intends to enable coordinates of 3D terrain information to be automatically adjusted in order to precisely match pieces of 3D terrain information without Ground Control Points (GCPs) when positions, scales, orientations, and the like are not matched between a Digital Surface Model (DSM) based on a high-altitude aerial image, which is acquired through satellite/aerial photography, and 3D terrain information based on a low-altitude aerial image, captured using a UAV or the like.

Another object of the present invention is to enable systematic connection of pieces of 3D terrain information, which are reconstructed based on input data captured at very different altitudes, such as a low-altitude UAV image and any of a high-altitude aerial image, a satellite image, and the like, thereby generating a convergent terrain model through data integration.

In order to accomplish the above objects, a method for matching 3D terrain information using aerial images captured at different altitudes according to an embodiment of the present invention includes receiving a high-altitude numerical height model based on a terrain image captured at a specific high altitude; receiving 3D terrain information observed from a low altitude, which is generated based on an aerial image captured at an altitude that is lower than the specific high altitude; converting the 3D terrain information observed from the low altitude into a numerical model in the same form as the high-altitude numerical height model, thereby generating a low-altitude numerical height model; measuring cross-correlation between the high-altitude numerical height model and the low-altitude numerical height model, thereby calculating matching parameters for enabling the low-altitude numerical height model to match the high-altitude numerical height model; and adjusting geospatial coordinates of the 3D terrain information observed from the low altitude based on the matching parameters and outputting georeferenced 3D terrain information in the same coordinate system as the high-altitude numerical height model.

Here, calculating the matching parameters may be configured to convert each of the low-altitude numerical height model and the high-altitude numerical height model into hierarchical pyramid data and to determine hierarchical matching.

Here, calculating the matching parameters may include determining the top level of the hierarchical pyramid data; calculating cross-correlation at all positions at the top level of the pyramid data of the low-altitude numerical height model and the high-altitude numerical height model, thereby extracting the position area at which the cross-correlation is highest; and measuring cross-correlation only in an area corresponding to the extracted position area at the second-highest level of the pyramid data of the low-altitude numerical height model and the high-altitude numerical height model.

Here, determining the top level may be configured to generate candidate pyramid data so as to have the greatest number of levels possible when the low-altitude numerical height model is downsized by a factor of 2 and to determine the top level of the hierarchical pyramid data based on a preset correlation threshold after calculating an autocorrelation function for the candidate pyramid data.

Here, determining the top level may include generating candidate pyramid data of the low-altitude numerical height model and the high-altitude numerical height model so as to have the greatest number of levels possible when the low-altitude numerical height model is downsized by a factor of 2; calculating cross-correlation between the low-altitude numerical height model and the high-altitude numerical height model in order from the highest level of the candidate pyramid data of the low-altitude numerical height model and the high-altitude numerical height model, thereby finding the highest cross-correlation and the second-highest cross-correlation; and determining the level of the candidate pyramid data at which the proportion of the second-highest cross-correlation to the highest cross-correlation starts to exceed a preset proportion to be the top level of the hierarchical pyramid data.

Here, calculating the matching parameters may be configured to find the position at which similarity between the low-altitude numerical height model and the high-altitude numerical height model is highest, among respective positions in the high-altitude numerical height model, by applying Euclidean transform, including at least one of translation, rotation, and scaling, to the low-altitude numerical height model, thereby determining whether the low-altitude numerical height model matches the high-altitude numerical height model.

Here, the high-altitude numerical height model may be a numerical model in the form of a Digital Surface Model (DSM) or a Digital Elevation Model (DEM).

Here, the 3D terrain information observed from the low altitude may be generated by receiving images captured by a UAV.

Here, the 3D terrain information observed from the low altitude may be 3D terrain information that includes information about terrain and aboveground features in the form of a 3D dense point cloud or a 3D mesh.

Also, in order to accomplish the above objects, an apparatus for matching 3D terrain information using aerial images captured at different altitudes according to an embodiment of the present invention includes a high-altitude numerical height model input unit for receiving a high-altitude numerical height model based on a terrain image captured at a specific high altitude; a low-altitude 3D terrain information input unit for receiving 3D terrain information observed from a low altitude, which is generated based on a terrain image captured at an altitude that is lower than the specific high altitude; a low-altitude numerical height model generation unit for generating a low-altitude numerical height model by converting the 3D terrain information observed from the low altitude into a numerical model in the same form as the high-altitude numerical height model; a matching parameter calculation unit for measuring cross-correlation between the high-altitude numerical height model and the low-altitude numerical height model, thereby calculating matching parameters for enabling the high-altitude numerical height model to match the low-altitude numerical height model; and a terrain information matching unit for adjusting geospatial coordinates of the 3D terrain information observed from the low altitude based on the matching parameters and outputting georeferenced 3D terrain information in the same coordinate system as the high-altitude numerical height model.

Here, the matching parameter calculation unit may convert each of the low-altitude numerical height model and the high-altitude numerical height model into hierarchical pyramid data and determine hierarchical matching.

Here, the matching parameter calculation unit may be configured to determine the top level of the hierarchical pyramid data, to calculate cross-correlation at all positions at the top level of the pyramid data of the low-altitude numerical height model and the high-altitude numerical height model and thereby extract the position area at which the cross-correlation is highest, and to measure cross-correlation only in an area corresponding to the extracted position area at the second-highest level of the pyramid data of the low-altitude numerical height model and the high-altitude numerical height model.

Here, when the top level of the hierarchical pyramid data is determined, the matching parameter calculation unit may be configured to generate candidate pyramid data so as to have the greatest number of levels possible when the low-altitude numerical height model is downsized by a factor of 2 and to determine the top level of the hierarchical pyramid data based on a preset correlation threshold after calculating an autocorrelation function for the candidate pyramid data.

Here, when the top level of the hierarchical pyramid data is determined, the matching parameter calculation unit may be configured to generate candidate pyramid data of the low-altitude numerical height model and the high-altitude numerical height model so as to have the greatest number of levels possible when the low-altitude numerical height model is downsized by a factor of 2, to find the highest cross-correlation and the second-highest cross-correlation by calculating cross-correlation between the low-altitude numerical height model and the high-altitude numerical height model in order from the highest level of the candidate pyramid data of the low-altitude numerical height model and the high-altitude numerical height model, and to determine the level of the candidate pyramid data at which the proportion of the second-highest cross-correlation to the highest cross-correlation starts to exceed a preset proportion to be the top level of the hierarchical pyramid data.

Here, the matching parameter calculation unit may find the position at which similarity between the low-altitude numerical height model and the high-altitude numerical height model is highest, among respective positions in the high-altitude numerical height model, by applying Euclidean transform including at least one of translation, rotation, and scaling to the low-altitude numerical height model, thereby determining whether the low-altitude numerical height model matches the high-altitude numerical height model.

Here, the high-altitude numerical height model may be a numerical model in the form of a Digital Surface Model (DSM) or a Digital Elevation Model (DEM), Here, the 3D terrain information observed from the low altitude may be generated by receiving images captured by a UAV.

Here, the 3D terrain information observed from the low altitude may be 3D terrain information that includes information about terrain and aboveground features in the form of a 3D dense point cloud or a 3D mesh.

Also, in order to accomplish the above objects, an apparatus for matching 3D terrain information using aerial images captured at different altitudes according to another embodiment of the present invention includes a high-altitude numerical height model input unit for receiving a high-altitude numerical height model based on a terrain image captured at a specific high altitude; a low-altitude numerical height model generation unit for generating a low-altitude numerical height model based on a terrain image captured at an altitude lower than the specific high altitude; a matching parameter calculation unit for measuring cross-correlation between the high-altitude numerical height model and the low-altitude numerical height model, thereby calculating matching parameters for enabling the high-altitude numerical height model to match the low-altitude numerical height model; and a terrain information matching unit for outputting a result of matching the terrain image captured at the specific high altitude and the terrain image captured at the altitude lower than the specific high altitude based on the matching parameters.

Here, each of the high-altitude numerical height model and the low-altitude numerical height model may be a numerical model in the form of a Digital Surface Model (DSM) or a Digital Elevation Model (DEM).

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Figure 1:
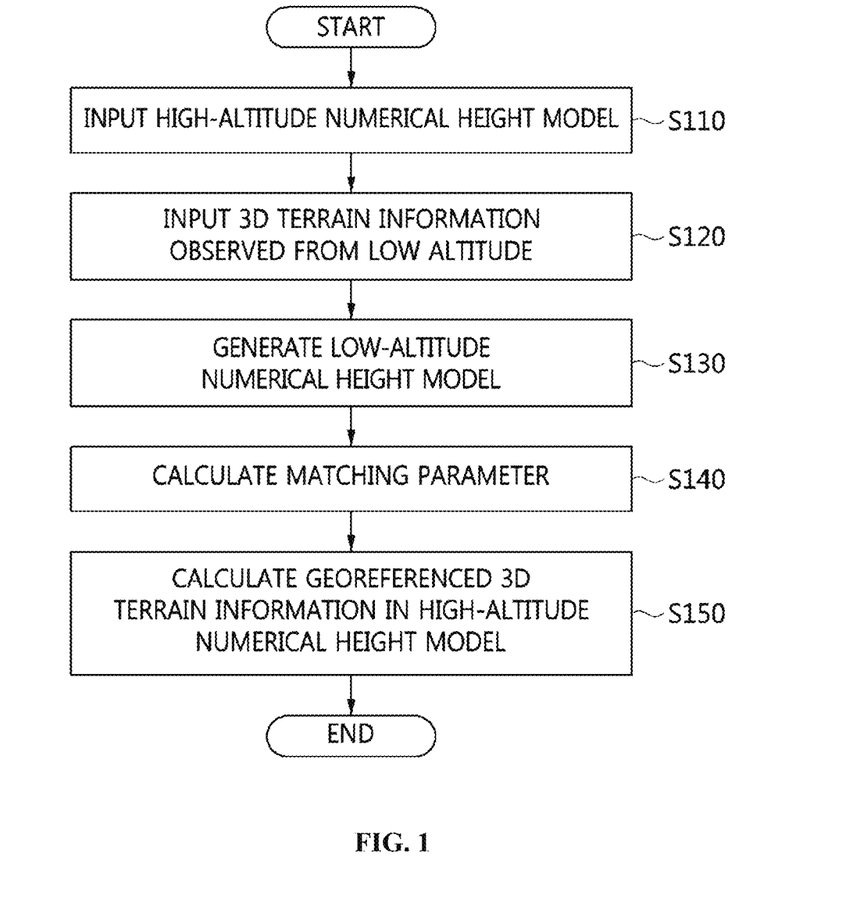
FIG. 1 is a flowchart for explaining a method for matching 3D terrain information using aerial images captured at different altitudes according to an embodiment of the present invention.

FIG. 1 is a flowchart for explaining a method for matching 3D terrain information using aerial images captured at different altitudes according to an embodiment of the present invention.

Referring to FIG. 1, in the method for matching 3D terrain information using aerial images captured at different altitudes according to an embodiment of the present invention, first, a high-altitude numerical height model is input at step S110 based on a terrain image captured at a specific high altitude. Here, the high-altitude numerical height model may be a numerical model in the form of a Digital Surface Model (DSM) or a Digital Elevation Model (DEM).

Subsequently, 3D terrain information observed from a low altitude, which is generated based on a terrain image captured at an altitude lower than the specific high altitude, is input at step S120. Here, the 3D terrain information observed from a low altitude may be generated by receiving images captured by a UAV. Also, the 3D terrain information observed from a low altitude may be 3D terrain information that includes information about terrain and aboveground features in the form of a 3D dense point cloud or a 3D mesh.

Subsequently, the 3D terrain information observed from a low altitude, which is input at step S120, is converted into a numerical model having the same form as the high-altitude numerical height model, whereby a low-altitude numerical height model is generated at step S130. In order to convert the 3D terrain information observed from a low altitude into a numerical model having the same form as the high-altitude numerical height model at step S130, any of various methods may be used, and one example is as follows. When a 3D dense point cloud is input as 3D terrain information observed from a low altitude, a target area is partitioned so as to have a grid form having the same cell size as the altitude data grid of a high-altitude DSM, one value is selected through median filtering, among altitude values of 3D points included in each cell, and the selected value may be mapped as the altitude of the corresponding cell. This process is repeated for all of the cells in the grid, whereby 3D dense point cloud data may be converted into a DSM.

Also, the cross-correlation between the high-altitude numerical height model and the low-altitude numerical height model is measured, whereby matching parameters that enable the high-altitude numerical height model to match the low-altitude numerical height model are calculated at step S140. At step S140, Euclidean transform, including at least one of translation, rotation, and scaling, is applied to the low-altitude numerical height model, and the position at which the similarity between the low-altitude numerical height model and the high-altitude numerical height model is highest is searched for, whereby whether the high-altitude numerical height model matches the low-altitude numerical height model may be determined. Specifically, similarity such as cross-correlation is measured at respective positions while moving the low-altitude numerical height model within a search area in the high-altitude numerical height model, whereby the position at which the similarity between the two numerical models is highest is found. Here, when the data size of the numerical model is large or when the search area is large, simply comparing the two numerical models at all positions incurs a high computational load. Therefore, the two numerical models are converted into data in the form of a hierarchical pyramid, and hierarchical matching is performed.

As described above, at step S140, each of the low-altitude numerical height model and the high-altitude numerical height model is converted into hierarchical pyramid data, and hierarchical matching may be performed. Specifically, step S140 may include determining the top level of the hierarchical pyramid data, extracting the position area having the highest cross-correlation by calculating cross-correlation at all positions at the top level of the pyramid data of the low-altitude numerical height model and the high-altitude numerical height model, and measuring cross-correlation only in the area corresponding to the extracted position area at the second-highest level of the pyramid data of the low-altitude numerical height model and the high-altitude numerical height model.

Here, determining the top level may be configured to generate candidate pyramid data having the greatest number of levels possible when the low-altitude numerical height model is downsized by a factor of 2, to calculate an autocorrelation function for the candidate pyramid data at each level thereof, and to determine the level at which the autocorrelation value is equal to or greater than a preset correlation threshold to be the top level of the pyramid data.

Alternatively, determining the top level may include generating candidate pyramid data of the low-altitude numerical height model and the high-altitude numerical height model such that the candidate pyramid data has the greatest number of levels possible when the low-altitude numerical height model is downsized by a factor of 2, detecting the highest cross-correlation and the second-highest cross-correlation by calculating the cross-correlation between the low-altitude numerical height model and the high-altitude numerical height model in order from the top level of the candidate pyramid data of the low-altitude numerical height model and the high-altitude numerical height model, and determining the level of the candidate pyramid data at which the proportion of the second-highest cross-correlation to the highest cross-correlation starts to exceed a preset proportion to be the top level of the hierarchical pyramid data.

More specifically, the optimal number of levels of the pyramid data, which is to be constructed in order to match digital surface models, is determined in consideration of both computation speed and accuracy, pyramid data of the low-altitude numerical height model and that of the high-altitude numerical height model are generated depending on the determined number of levels, and hierarchical matching is performed. Hierarchical matching is configured as follows. Depending on the pyramid-matching method, the cross-correlation between the two numerical models is calculated at all positions within a search range at the top level. Then, from the second level, the cross-correlation is calculated only in an area around the position at which the highest cross-correlation is calculated at the level right above the corresponding level. Therefore, the higher the top level of the pyramid data, the faster the operation for hierarchical matching. When the grid size of the low-altitude numerical height model is 1024*1024, pyramid data may theoretically have a maximum of ten levels, in which case the low-altitude numerical height model has a size of 2*2 at the top level of the pyramid data. However, when pyramid data is configured to have an excessively large number of levels, the computation may be faster, but the accuracy of matching may be reduced, whereby incorrect matching information may be calculated from the low-altitude numerical height model. Therefore, it is necessary to determine the optimal number of levels of pyramid data in consideration of both speed and accuracy.

An embodiment of the present invention proposes a method for checking two conditions in order to select the optimal number of levels of pyramid data. Here, the number of levels that meets all of the two conditions may be selected. Alternatively, either of the two conditions is selected depending on the characteristics of input data and the application purpose, and the number of levels that meets the selected condition may be selected in consideration of the other condition.

The first method for determining the top level is as follows. First, candidate pyramid data is generated so as to have the greatest number of levels possible when the low-altitude numerical height model is downsized by a factor of 2. Then, from the lowest level of the candidate pyramid data, autocorrelation is repeatedly calculated while the low-altitude numerical height model is shifted by one cell along a horizontal axis at the corresponding level. This process is repeated such that an autocorrelation function of the low-altitude numerical height model is calculated at every level of the generated candidate pyramid data. Then, using the following Equation (1), the maximum level, $L_{max}$, at which s, which denotes the degree of shifting when autocorrelation equal to or greater than $AC_{th}$ is calculated, is equal to or greater than $S_{th}$, is determined. Here, $AC_{th}$ denotes a correlation threshold, and $S_{th}$ denotes a shift threshold. In the following equation, $DSM_L(x)$ denotes the L level of the pyramid data, which is the downsized low-altitude numerical height model in the axis perpendicular to the plane, and $DSM_L(x-s)$ denotes data acquired by rotating and shifting the low-altitude numerical height model by s in a horizontal direction at the L level of the pyramid data. Also, opConv denotes a convolution operation of calculating the sum of elementwise multiplication. In an embodiment of the present invention, $AC_{th}$ is set to 0.7, and $S_{th}$ is set to 1.

$$L_{max}=\max(L: \max(s:\text{opConv}(DSM_L(x), DSM_L(x-s)) > AC_{th}) > S_{th}) \quad (1)$$

Figure 2:
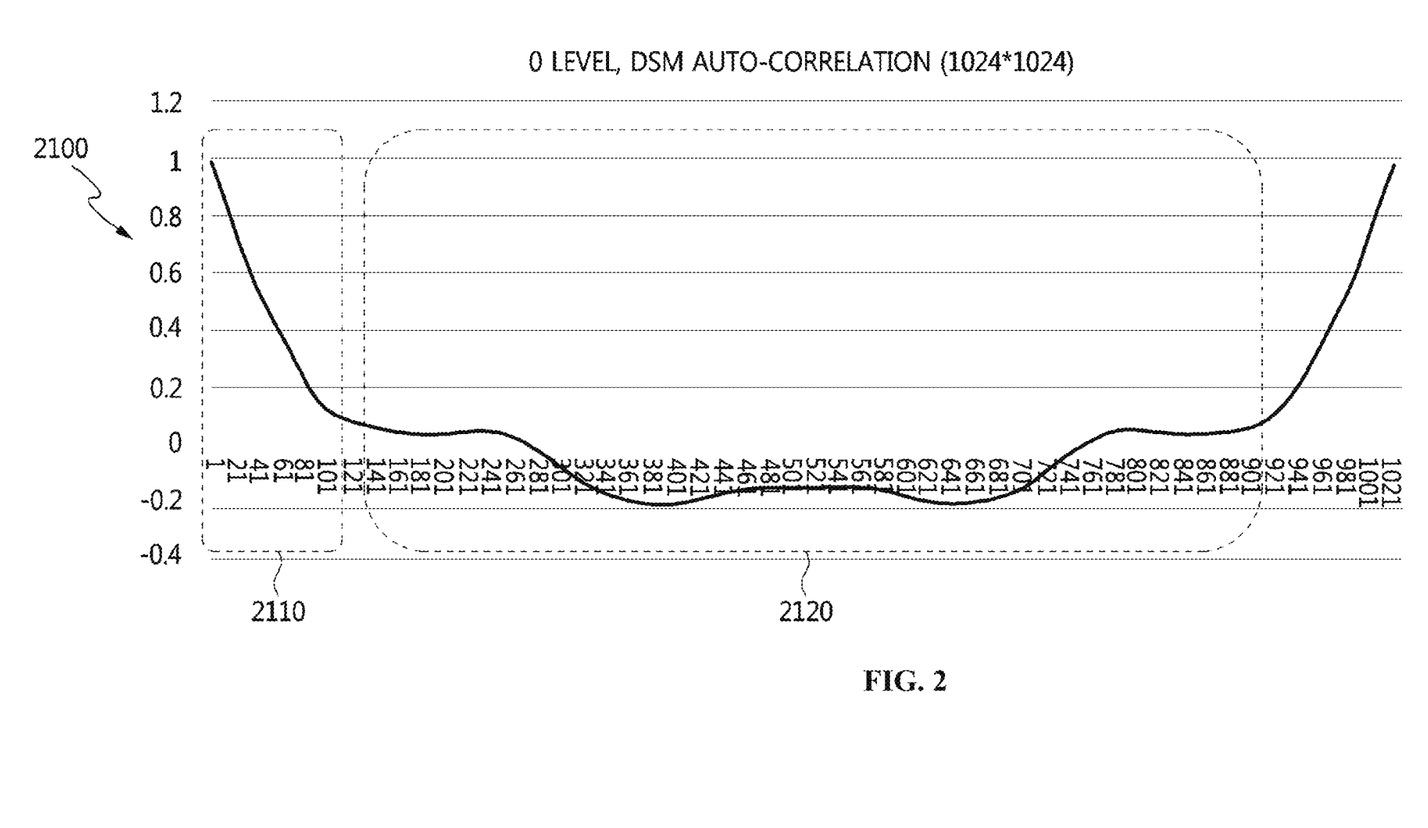
FIGS. 2 to 4 are autocorrelation graphs for respective candidate levels in order to determine the optimal top level of pyramid data in a method for matching 3D terrain information using aerial images captured at different altitudes according to an embodiment of the present invention.
Figure 3:
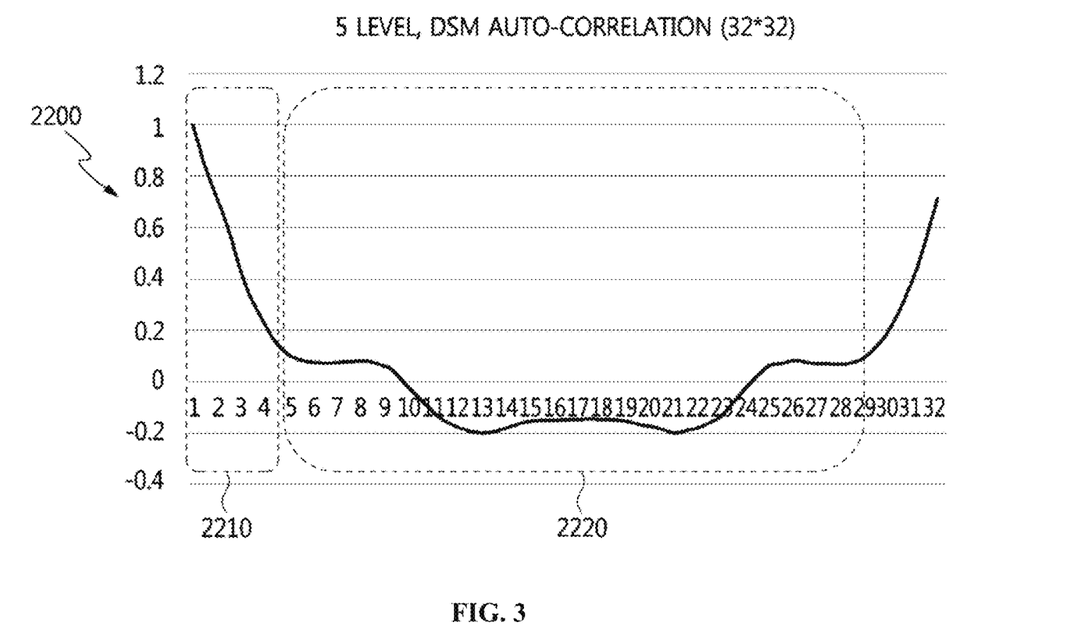
Figure 4:
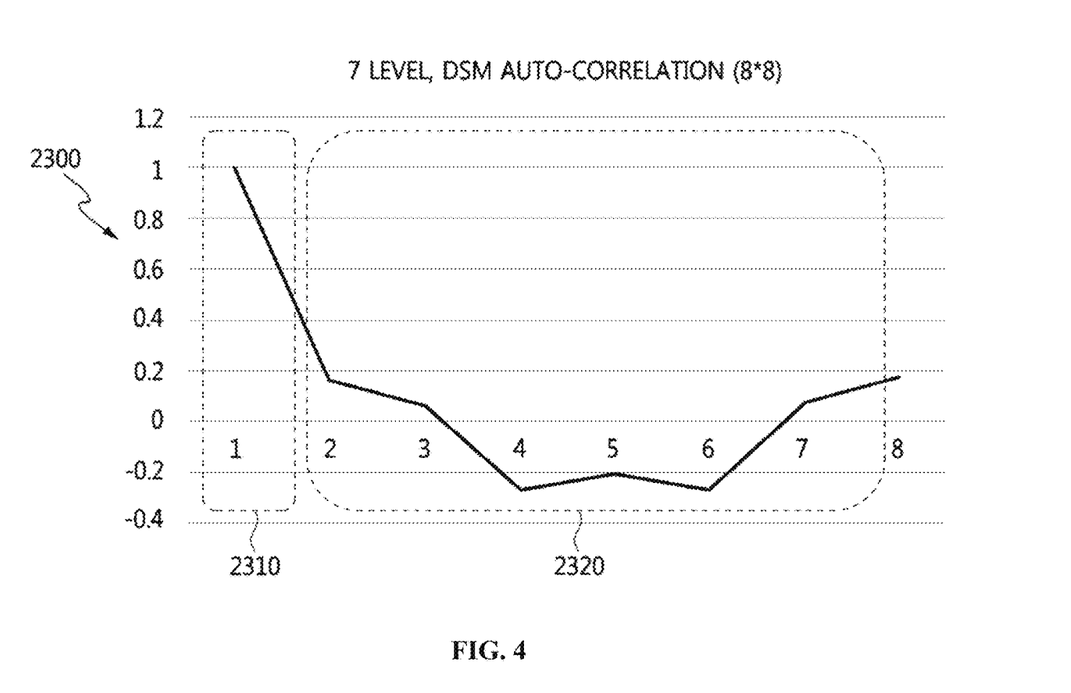

FIGS. 2 to 4 show examples of autocorrelation graphs for respective pyramid levels, which are used when the top level of pyramid data is determined. When a low-altitude DSM, in which the number of cells in horizontal and vertical axes in a grid is 1024, is input, the graph 2100 shows an autocorrelation graph of an original DSM when a pyramid level is 0, and the graphs 2200 and 2300 show autocorrelation graphs for level 5 and level 7, which are downsized to 1/32 and 1/64, respectively. The start position 1 on the horizontal axis indicates that there is no shift (shift=0), and values on the vertical axis are autocorrelation values. Here, the sections 2110, 2210 and 2310 are sections in which the autocorrelation value starts to decrease in the autocorrelation graphs for the respective levels, and the sections 2120, 2220, and 2310 are sections in which matching is meaningless because the autocorrelation value is so low. Referring to the graph 2300, the autocorrelation value is 1.0 at the start position 1 (shift=0), and when the shift becomes 1 (shift=1), the autocorrelation value rapidly decreases to 0.14. Therefore, at an excessively downsized level, for example, at level 7, a response to the noise between DSMs becomes more sensitive, and incorrect matching may be caused. In Equation (1), when $AC_{th}$ is set to 0.7 and when $S_{th}$ is set to 1, $L_{max}$ is determined to be level 5.

The second method for determining the top level is as follows. Candidate pyramid data for a low-altitude numerical height model and candidate pyramid data for a high-altitude numerical height model are generated so as to have the greatest number of levels possible when the low-altitude numerical height model is downsized by a factor of 2. Then, from the highest level, cross-correlation between the low-altitude numerical height model and the high-altitude numerical height model is calculated at all positions within the search area of the high-altitude numerical height model, whereby the position having the highest cross-correlation $CC_{max1}$ is found. Then, excluding a certain range around the position having the highest cross-correlation, the position having the second-highest cross-correlation $CC_{max2}$ is found (in an embodiment, the certain range is set using the width and length of a low-altitude DSM). Then, when the proportion of the highest cross-correlation to the second-highest cross-correlation, that is, $CC_{max1}/CC_{max2}$, is equal to or greater than a certain value (in an embodiment, the certain value being set to 1.5), the current level is selected as the top level of the pyramid data. When $CC_{max1}/CC_{max2}$ is less than the certain value, the process is repeated for the level below the current level.

Depending on the determined top level, pyramid data for the low-altitude DSM and pyramid data for the high-altitude DSM are generated, and pyramid matching is performed. In the present invention, hierarchical matching and pyramid matching have the same meaning, and may be used interchangeably with each other. In this case, when the optimal top level is determined to be level 5 (the lowest level is level 0), as in the above-described example, original data at level 0 is repeatedly downsized by a factor of 2 until level 5 is generated, whereby pyramid data having six levels (from level 0 to level 5) is generated for each of the low-altitude DSM and the high-altitude DSM. Then, pyramid matching between the generated pyramid data for the low-altitude DSM and pyramid data for the high-altitude DSM is performed. At the top level, cross-correlation is calculated at all positions within the range of the high-altitude DSM by placing the low-altitude DSM therein by changing matching parameters for translation, rotation, and scaling, whereby the matching parameters enabling the highest cross-correlation are determined. Then, from the level below the top level, cross-correlation is repeatedly calculated in such a way that the matching parameters, which enable the highest cross-correlation at the level right above the current level, are adjusted to the current level and changed within certain ranges, whereby matching parameters that enable the low-altitude DSM to optimally match the high-altitude DSM at the level 0, corresponding to the original data, are calculated. The matching parameters enabling optimal matching may include all of translation, rotation, and scaling of the DSMs, but may include only some thereof as needed.

Then, the geospatial coordinates of the 3D terrain information observed from a low altitude are adjusted based on the matching parameters, whereby the 3D terrain information georeferenced in the same coordinate system as the high-altitude DSM is output at step S150.

Figure 5:
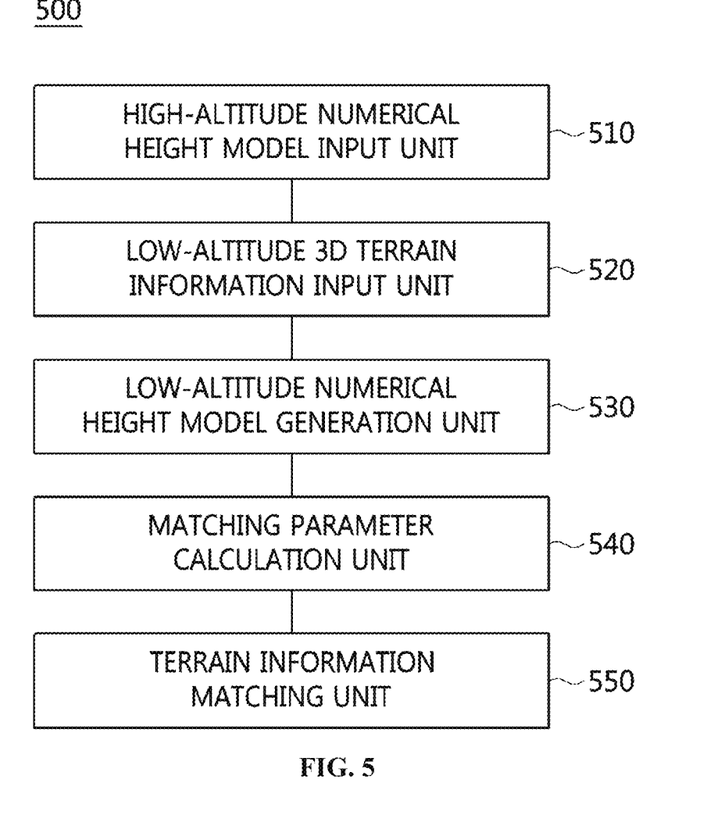
FIG. 5 is a block diagram for explaining an apparatus for matching 3D terrain information using aerial images captured at different altitudes according to an embodiment of the present invention.

FIG. 5 is a block diagram for explaining an apparatus for matching 3D terrain information using aerial images captured at different altitudes according to an embodiment of the present invention.

Referring to FIG. 5, the apparatus 500 for matching 3D terrain information using aerial images captured at different altitudes according to an embodiment of the present invention includes a high-altitude numerical height model input unit 510, a low-altitude 3D terrain information input unit 520, a low-altitude numerical height model generation unit 530, a matching parameter calculation unit 540, and a terrain information matching unit 550.

The high-altitude numerical height model input unit 510 receives a high-altitude numerical height model based on a terrain image captured at a specific high altitude. Here, the high-altitude numerical height model may be a numerical model in the form of a Digital Surface Model (DSM) or a Digital Elevation Model (DEM).

The low-altitude 3D terrain information input unit 520 receives 3D terrain information observed from a low altitude, which is generated based on a terrain image captured at an altitude lower than the specific high altitude. Here, the 3D terrain information observed from a low altitude may be generated by receiving images captured using a UAV.

The low-altitude numerical height model generation unit 530 generates a low-altitude numerical height model by converting the 3D terrain information observed from a low altitude into a numerical model having the same form as the high-altitude numerical height model. Here, the 3D terrain information observed from a low altitude may be 3D terrain information that includes information about terrain and aboveground features in the form of a 3D dense point cloud or a 3D mesh. Additionally, the low-altitude numerical height model generation unit 530 may generate a low-altitude numerical height model based on the terrain image captured at an altitude lower than the specific high altitude. Here, the low-altitude numerical height model is in the same form as the high-altitude numerical height model, and the low-altitude numerical height model and the high-altitude numerical height model may be in the form of a DSM or a DEM.

The matching parameter calculation unit 540 measures the cross-correlation between the high-altitude numerical height model and the low-altitude numerical height model, thereby calculating matching parameters that enable the high-altitude numerical height model to match the low-altitude numerical height model. The matching parameter calculation unit 540 may convert each of the low-altitude numerical height model and the high-altitude numerical height model into hierarchical pyramid data and determine hierarchical matching. Also, the matching parameter calculation unit 540 applies Euclidean transform including at least one of translation, rotation, and scaling to the low-altitude numerical height model and searches for the position at which the similarity between the low-altitude numerical height model and the high-altitude numerical height model is highest, among the respective positions in the high-altitude numerical height model, thereby determining whether the high-altitude numerical height model matches the low-altitude numerical height model.

Also, the matching parameter calculation unit 540 may determine the top level of the hierarchical pyramid data, extract a position area in which the cross-correlation is highest by calculating cross-correlation at all positions at the top level of the pyramid data of the low-altitude numerical height model and the high-altitude numerical height model, and measure the cross-correlation only in an area corresponding to the extracted position area at the second-highest level of the pyramid data of the low-altitude numerical height model and the high-altitude numerical height model.

Here, when it determines the top level of the hierarchical pyramid data, the matching parameter calculation unit 540 may generate candidate pyramid data having the greatest number of levels possible when the low-altitude numerical height model is downsized by a factor of 2, calculate an autocorrelation function for the candidate pyramid data, and determine the top level of the hierarchical pyramid data based on a preset correlation threshold.

Alternatively, when it determines the top level of the hierarchical pyramid data, the matching parameter calculation unit 540 may generate candidate pyramid data for the low-altitude numerical height model and candidate pyramid data for the high-altitude numerical height model so as to have the greatest number of levels possible when the low-altitude numerical height model is downsized by a factor of 2, search for the highest cross-correlation and the second-highest cross-correlation by calculating the cross-correlation between the low-altitude numerical height model and the high-altitude numerical height model from the highest level of the candidate pyramid data of the low-altitude numerical height model and that of the high-altitude numerical height model, and determine the level of the candidate pyramid data at which the proportion of the second-highest cross-correlation to the highest cross-correlation starts to exceed a preset proportion to be the top level of the hierarchical pyramid data.

The terrain information matching unit 550 adjusts the geospatial coordinates of the 3D terrain information observed from a low altitude based on the matching parameters and outputs georeferenced 3D terrain information in the same coordinate system as the high-altitude numerical height model.

Figure 6:
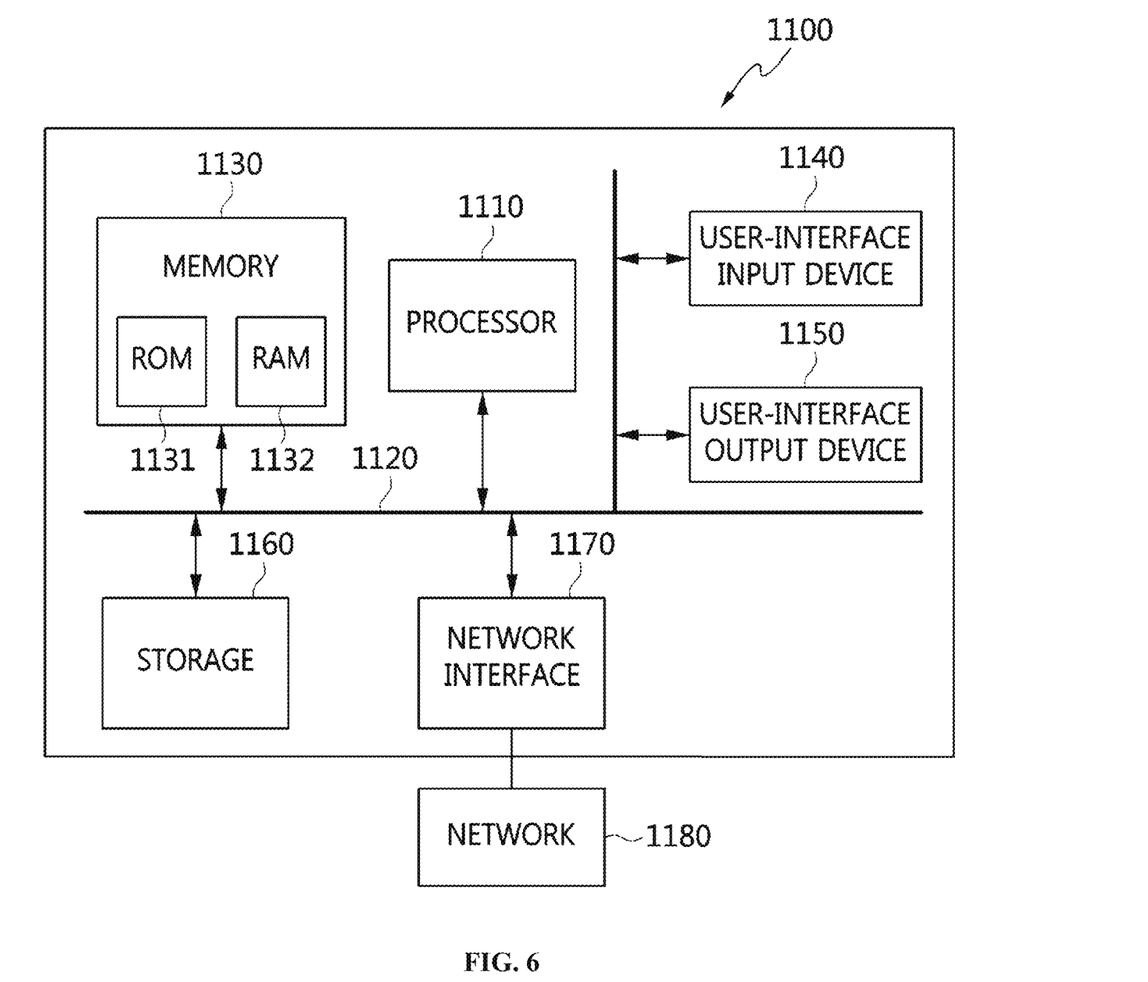
FIG. 6 is a view that shows a computer system according to an embodiment of the present invention.

FIG. 6 is a view that shows a computer system according to an embodiment of the present invention.

The apparatus for matching 3D terrain information using aerial images captured at different altitudes according to the present invention or some of the components thereof may be implemented in a computer system 1100.

Referring to FIG. 6, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile and nonvolatile storage media. For example, the memory may include ROM 1131 or RAM 1132.

According to the present invention, precise geometry matching between pieces of 3D terrain information, which are reconstructed by receiving images captured at different altitudes, may be performed. More particularly, when positions, orientations, scales and the like are not matched between a Digital Surface Model (DSM) based on a high-altitude aerial image, which is acquired through satellite/aerial photography, and 3D terrain information based on a low-altitude aerial image captured using a UAV or the like, the present invention enables coordinates of the 3D terrain information to be automatically adjusted for precise matching without Ground Control Points (GCPs).

Also, the present invention enables systematic connection of pieces of 3D terrain information, which are reconstructed based on input data captured at very different altitudes, such as a low-altitude UAV image and any of a high-altitude aerial image, a satellite image, and the like, thereby generating a convergent terrain model through data integration.

As described above, the apparatus and method for matching 3D terrain information using aerial images captured at different altitudes according to the present invention are not limitedly applied to the configurations and operations of the above-described embodiments, but all or some of the embodiments may be selectively combined and configured, so that the embodiments may be modified in various ways.

What is claimed is:

1. A method for matching 3D terrain information using aerial images captured at different altitudes, comprising:
processing computer executable program code embodied in non-transitory computer readable storage media by one or more processors, the computer executable program code comprising:
program code that receives a high-altitude numerical height model based on a terrain image captured at a specific high altitude;
program code that receives 3D terrain information observed from a low altitude, which is generated based on a terrain image captured at an altitude that is lower than the specific high altitude;
program code that converts the 3D terrain information observed from the low altitude into a numerical model in a same form as the high-altitude numerical height model, thereby generating a low-altitude numerical height model;
program code that measures a cross-correlation between the high-altitude numerical height model and the low-altitude numerical height model, and that calculates matching parameters for enabling the high-altitude numerical height model to match the low-altitude numerical height model; and program code that adjusts geospatial coordinates of the 3D terrain information observed from the low altitude based on the matching parameters and and that outputs georeferenced 3D terrain information in a same coordinate system as the high-altitude numerical height model, wherein the program code that calculates the matching parameters is configured to convert each of the low-altitude numerical height model and the high-altitude numerical height model into hierarchical pyramid data and to determine hierarchical matching, and wherein the program code that calculates the matching parameters comprises:
program code that determines a top level of the hierarchical pyramid data;
program code that calculates a cross-correlation at all positions at the top level of the pyramid data of the low-altitude numerical height model and the high-altitude numerical height model, thereby extracting a position area at which the cross-correlation is highest; and
program code that measures a cross-correlation only in an area corresponding to the extracted position area at a second-highest level of the pyramid data of the low-altitude numerical height model and the high-altitude numerical height model.

2. The method of claim 1, wherein the program code that determines the top level is configured to generate candidate pyramid data so as to have a greatest number of levels possible when the low-altitude numerical height model is downsized by a factor of 2 and to determine the top level of the hierarchical pyramid data based on a preset correlation threshold after calculating an autocorrelation function for the candidate pyramid data.

3. The method of claim 1, wherein the program code that determines the top level comprises:
program code that generates candidate pyramid data of the low-altitude numerical height model and the high-altitude numerical height model so as to have a greatest number of levels possible when the low-altitude numerical height model is downsized by a factor of 2;
program code that calculates a cross-correlation between the low-altitude numerical height model and the high-altitude numerical height model in order from a highest level of the pyramid data of the low-altitude numerical height model and the high-altitude numerical height model, thereby finding a highest cross-correlation and a second-highest cross-correlation; and
program code that determines a level of the candidate pyramid data at which a proportion of the second-highest cross-correlation to the highest cross-correlation starts to exceed a preset proportion to be the top level of the hierarchical pyramid data.

4. The method of claim 1, wherein calculating the matching parameters is configured to find a position at which a similarity between the low-altitude numerical height model and the high-altitude numerical height model is highest, among respective positions in the high-altitude numerical height model, by applying a Euclidean transform, including at least one of translation, rotation, and scaling, to the low-altitude numerical height model, thereby determining whether the high-altitude numerical height model matches the low-altitude numerical height model.

5. The method of claim 1, wherein the high-altitude numerical height model is a numerical model in a form of a Digital Surface Model (DSM) or a Digital Elevation Model (DEM).

6. The method of claim 1, wherein the 3D terrain information observed from the low altitude is generated by receiving images captured by a UAV.

7. The method of claim 1, wherein the 3D terrain information observed from the low altitude is 3D terrain information that includes information about terrain and aboveground features in a form of a 3D dense point cloud or a 3D mesh.

8. An apparatus for matching 3D terrain information using aerial images captured at different altitudes, comprising:
one or more processors that process computer executable program code embodied in non-transitory computer readable storage media, the computer executable program code comprising:
high-altitude numerical height model input program code that receives a high-altitude numerical height model based on a terrain image captured at a specific high altitude;
low-altitude 3D terrain information input program code that receives 3D terrain information observed from a low altitude, which is generated based on a terrain image captured at an altitude that is lower than the specific high altitude;
low-altitude numerical height model generation program code that generates a low-altitude numerical height model by converting the 3D terrain information observed from the low altitude into a numerical model in a same form as the high-altitude numerical height model;
matching parameter calculation program code that measures a cross-correlation between the high-altitude numerical height model and the low-altitude numerical height model, thereby calculating matching parameters for enabling the high-altitude numerical height model to match the low-altitude numerical height model; and
terrain information matching program code that adjusts geospatial coordinates of the 3D terrain information observed from the low altitude based on the matching parameters and outputting georeferenced 3D terrain information in a same coordinate system as the high-altitude numerical height model,
wherein the matching parameter calculation program code converts each of the low-altitude numerical height model and the high-altitude numerical height model into hierarchical pyramid data and determines hierarchical matching, and
wherein the matching parameter calculation program code comprises:
program code that determines a top level of the hierarchical pyramid data;
program code that calculates a cross-correlation at all positions at the top level of the pyramid data of the low-altitude numerical height model and the high-altitude numerical height model and thereby extracts a position area at which the cross-correlation is highest; and
program code that measures a cross-correlation only in an area corresponding to the extracted position area at a second-highest level of the pyramid data of the low-altitude numerical height model and the high-altitude numerical height model.

9. The apparatus of claim 8, wherein, when the top level of the hierarchical pyramid data is determined, the matching parameter calculation program code generates candidate pyramid data so as to have a greatest number of levels possible when the low-altitude numerical height model is downsized by a factor of 2 and determines the top level of the hierarchical pyramid data based on a preset correlation threshold after calculating an autocorrelation function for the candidate pyramid data.

10. The apparatus of claim 8, wherein, when the top level of the hierarchical pyramid data is determined, the matching parameter calculation program code:
   generates candidate pyramid data of the low-altitude numerical height model and the high-altitude numerical height model so as to have a greatest number of levels possible when the low-altitude numerical height model is downsized by a factor of 2;
   finds a highest cross-correlation and a second-highest cross-correlation by calculating a cross-correlation between the low-altitude numerical height model and the high-altitude numerical height model in order from a highest level of the pyramid data of the low-altitude numerical height model and the high-altitude numerical height model; and
   determines a level of the candidate pyramid data at which a proportion of the second-highest cross-correlation to the highest cross-correlation starts to exceed a preset proportion to be the top level of the hierarchical pyramid data.

11. The apparatus of claim 8, wherein the matching parameter calculation unit finds a position at which a similarity between the low-altitude numerical height model and the high-altitude numerical height model is highest, among respective positions in the high-altitude numerical height model, by applying a Euclidean transform including at least one of translation, rotation, and scaling to the low-altitude numerical height model, thereby determining whether the high-altitude numerical height model matches the low-altitude numerical height model.

12. The apparatus of claim 8, wherein the high-altitude numerical height model is a numerical model in a form of a Digital Surface Model (DSM) or a Digital Elevation Model (DEM).

13. The apparatus of claim 8, wherein the 3D terrain information observed from the low altitude is generated by receiving images captured by a UAV.

14. The apparatus of claim 8, wherein the 3D terrain information observed from the low altitude is 3D terrain information that includes information about terrain and aboveground features in a form of a 3D dense point cloud or a 3D mesh.

15. An apparatus for matching 3D terrain information using aerial images captured at different altitudes, comprising:
   one or more processors that process computer executable program code embodied in non-transitory computer readable storage media, the computer executable program code comprising:
   high-altitude numerical height model input program code that receives a high-altitude numerical height model based on a terrain image captured at a specific high altitude;
   low-altitude numerical height model generation program code that generates a low-altitude numerical height model based on a terrain image captured at an altitude lower than the specific high altitude;
   matching parameter calculation program code that measures a cross-correlation between the high-altitude numerical height model and the low-altitude numerical height model, and that calculates matching parameters for enabling the high-altitude numerical height model to match the low-altitude numerical height model; and
   terrain information matching program code that outputs a result of matching the terrain image captured at the specific high altitude and the terrain image captured at the altitude lower than the specific high altitude based on the matching parameters,
   wherein the matching parameter calculation program code converts each of the low-altitude numerical height model and the high-altitude numerical height model into hierarchical pyramid data and determines hierarchical matching, and
   wherein the matching parameter calculation program code comprises:
      program code that determines a top level of the hierarchical pyramid data;
      program code that calculates a cross-correlation at all positions at the top level of the pyramid data of the low-altitude numerical height model and the high-altitude numerical height model and thereby extracts a position area at which the cross-correlation is highest; and
      program code that measures a cross-correlation only in an area corresponding to the extracted position area at a second-highest level of the pyramid data of the low-altitude numerical height model and the high-altitude numerical height model.

16. The apparatus of claim 15, wherein each of the high-altitude numerical height model and the low-altitude numerical height model is a numerical model in a form of a Digital Surface Model (DSM) or a Digital Elevation Model (DEM).

* * * * *